US011988188B2

(12) United States Patent
Rubner et al.

(10) Patent No.: US 11,988,188 B2
(45) Date of Patent: May 21, 2024

(54) ROTOR FOR A WIND TURBINE, AND METHOD

(71) Applicant: Wobben Properties GmbH, Aurich (DE)

(72) Inventors: Florian Rubner, Aurich (DE); Torsten Jepsen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/298,849

(22) PCT Filed: Dec. 4, 2019

(86) PCT No.: PCT/EP2019/083593
§ 371 (c)(1),
(2) Date: Jun. 1, 2021

(87) PCT Pub. No.: WO2020/115092
PCT Pub. Date: Jun. 11, 2020

(65) Prior Publication Data
US 2022/0034292 A1   Feb. 3, 2022

(30) Foreign Application Priority Data

Dec. 4, 2018   (DE) ..................... 10 2018 130 895.7

(51) Int. Cl.
*F03D 1/06*   (2006.01)
(52) U.S. Cl.
CPC ...... *F03D 1/0658* (2013.01); *F05B 2230/604* (2013.01); *F05B 2260/301* (2013.01)

(58) Field of Classification Search
CPC .... F03D 1/06; F03D 1/0658; F05B 2230/604; F05B 2260/30; F05B 2260/301; F05B 2260/79
See application file for complete search history.

(56) References Cited

U.S. PATENT DOCUMENTS 3,734,642 A * 5/1973 Dixon ..................... B64C 27/48
416/61
6,371,730 B1   4/2002 Wobben
(Continued)

FOREIGN PATENT DOCUMENTS

CN            1795331 A    6/2006
CN          101194103 A    6/2008
(Continued)

*Primary Examiner* — Brian P Wolcott
(74) *Attorney, Agent, or Firm* — Seed IP Law Group LLP

(57) ABSTRACT

A rotor for a wind turbine, to a rotor blade for a wind turbine, to a blade-fastening element for the fastening of a rotor blade, to a wind turbine, and to a method for mounting a rotor. A rotor for a wind turbine, comprising at least one rotor blade which extends from a blade tip to a face side, a hub having a blade-fastening element which, at the rotor-blade side thereof, has a blind hole for receiving a longitudinal bolt for the fastening of a rotor blade to the blade-fastening element, wherein the rotor blade has a fastening region which is of tubular form and which is arranged adjoining the face side, wherein the fastening region has at its outer circumferential surface and/or at its inner circumferential surface at least one thickened portion.

15 Claims, 11 Drawing Sheets

(56) References Cited

U.S. PATENT DOCUMENTS

| | | | |
|---|---|---|---|
| 6,799,947 B2* | 10/2004 | Wobben | F03D 80/70 |
| | | | 416/174 |
| 7,077,630 B2 | 7/2006 | Wobben | |
| 7,722,328 B2 | 5/2010 | Wobben | |
| 10,578,077 B2* | 3/2020 | Hoffmann | F03D 1/0675 |
| 10,844,833 B2 | 11/2020 | Trede | |
| 10,865,767 B2* | 12/2020 | Rubner | F03D 1/0658 |
| 2003/0147751 A1 | 8/2003 | Wobben | |
| 2010/0122442 A1 | 5/2010 | Kirkpatrick et al. | |
| 2013/0216394 A1 | 8/2013 | Leonard | |
| 2014/0169980 A1* | 6/2014 | Kyriakides | F03D 1/0675 |
| | | | 416/241 R |
| 2014/0334934 A1* | 11/2014 | Kannenberg | F03D 1/0675 |
| | | | 416/217 |
| 2017/0022969 A1* | 1/2017 | Hoffmann | F03D 1/0675 |

FOREIGN PATENT DOCUMENTS

| | | | | |
|---|---|---|---|---|
| CN | 103987959 A | | 8/2014 | |
| CN | 108798992 A | | 11/2018 | |
| DE | 19733372 C1 | | 1/1999 | |
| DE | 10324166 A1 | | 12/2004 | |
| DE | 102006022279 A1 | | 11/2007 | |
| DE | 102014206670 A1 | | 10/2015 | |
| DE | 102017004056 A1 | | 10/2018 | |
| EP | 2806155 A1 | | 11/2014 | |
| EP | 2952739 A1 | | 12/2015 | |
| GB | 2509082 A | * | 6/2014 | F03B 13/264 |
| GB | 2509082 A | | 6/2014 | |
| JP | 2016031043 A | | 3/2016 | |
| WO | 03/019004 A1 | | 3/2003 | |
| WO | 2010/067082 A2 | | 6/2010 | |
| WO | 2014/076183 A1 | | 5/2014 | |
| WO | 2014/173447 A1 | | 10/2014 | |
| WO | 2017/025640 A1 | | 2/2017 | |

* cited by examiner

ROTOR FOR A WIND TURBINE, AND METHOD

BACKGROUND

Technical Field

The invention relates to a rotor for a wind turbine, to a rotor blade for a wind turbine, to a blade-fastening element for the fastening of a rotor blade, to a wind turbine, and to a method for mounting a rotor.

Description of the Related Art

Wind turbines of the type mentioned in the introduction are well known. Currently, the most common type of wind turbine is the so-called horizontal-axis wind turbine, which is conventionally equipped with three rotor blades, wherein wind turbines having one, two, four or more rotor blades are also possible. Wind turbines have increasingly larger structural forms in order, on the one hand, to be able to achieve a higher rated power and, on the other hand, to allow better utilization of the wind.

Aside from a rotor arranged at a nacelle, wind turbines generally comprise a tower on which the nacelle with the rotor is arranged so as to be rotatable about a substantially vertically oriented axis. Aside from the at least one rotor blade, the rotor comprises a hub on which the at least one rotor blade is arranged. Preferably, the at least one rotor blade is arranged rotatably on the hub, so as to be able to realize pitch angle adjustment. In addition to the static load on account of the inherent weight of the rotor blades, it is known that high loads occur at the connecting point between the rotor blade and the hub during the rotation of the rotor due to centrifugal forces which arise.

On account of these large static and dynamic forces, the connecting point between hub and rotor blade should be designed with a high strength. Furthermore, at said connecting point, high safety factors are generally taken into consideration, in order as far as possible to rule out a situation in which a rotor blade breaks off from the hub. Breaking-off of a rotor blade not only leads to damage to the wind turbine itself, but also can cause considerable further damage in the surrounding area of the wind turbine. Due to the increasingly larger structural forms of wind turbines, the connecting points between rotor blade and hub are being designed more solidly, with the result that the weight of the rotor is increasing significantly on account of said connecting point. Possibilities for the configuration of the connecting point between a hub and a rotor blade are presented for example in DE 197 33 372 C1 or DE 103 24 166 A1.

The increasing weight of the rotor results in various disadvantages. The heavy rotors lead to larger forces and/or moments at the wind turbine. As a result of said larger forces and/or moments, it is firstly the case that the main components of the wind turbine, for example the drive train, are dimensioned to be larger or so as to have a higher load-bearing capacity, and it is secondly also the case that further components, such as for example fastening elements, are dimensioned to be larger or so as to have a higher load-bearing capacity. In this way, the greater weight of the rotor also has an influence on adjacent components of the wind turbine, which are consequently designed at greater expense and likewise to be heavier.

Altogether, a heavier rotor leads to an altogether significantly heavier nacelle for a wind turbine. Furthermore, it is possibly also the case that the tower has to be designed to be more stable in order to be able to bear such a heavy nacelle with heavy rotor. Furthermore, the mounting of a heavy rotor and/or of a heavy nacelle is made more difficult, such that the positioning of the components is more difficult and, possibly, larger cranes are necessary. Although the rotors and methods for operating and for mounting such rotors known in the prior art offer various advantages, further improvements are desirable.

The German Patent and Trademark Office has searched the following prior art in the priority application relating to the present application: WO 2003/019 004 A1, DE 10 2017 004 056 A1, DE 10 2014 206 670 A1, EP 2 806 155 A1, WO 2017/025 640 A1, WO 2014/173 447 A1, DE 197 33 372 C1, DE 103 24 166 A1.

BRIEF SUMMARY

Provided is a rotor for a wind turbine, a rotor blade for a wind turbine, a blade-fastening element for the fastening of a rotor blade, a wind turbine, and a method for mounting a rotor that reduce or eliminate one or more of the stated disadvantages. Provided are techniques which makes possible simplified mounting of a rotor on a nacelle. One or more of the techniques may provide increased resource efficiency and/or lower costs.

According to a first aspect, provided is a rotor for a wind turbine that comprises at least one rotor blade which extends from a blade tip to a face side, a hub having a blade-fastening element which, at the rotor-blade side thereof, has a blind hole for receiving a longitudinal bolt for the fastening of a rotor blade to the blade-fastening element, wherein the rotor blade has a fastening region which is of tubular form and which is arranged adjoining the face side, wherein the fastening region has at its outer circumferential surface and/or at its inner circumferential surface at least one thickened portion, wherein the at least one thickened portion is extended through by a longitudinal bolt cutout, in the form of a passage opening, with two opposite ends, wherein a first end of the longitudinal bolt cutout is arranged on the face side of the rotor blade, and wherein a longitudinal bolt is arranged in the blind hole and in the longitudinal bolt cutout for the fastening of the rotor blade to the blade-fastening element.

Embodiments described herein are based on the realization that a part of the weight of a rotor is determined by the connecting point between the at least one rotor blade and the hub. In order to ensure the required strength at the connecting point between rotor blade and hub, said connecting point is to be of solid design. By way of the rotor, the connecting point between rotor blade and hub can be designed to be lighter and/or more compact while the strength preferably remains the same or is even improved. By way of the arrangement, the cross section thereof is reduced, which results in optimized material usage. The reduction in the inherent weight results in the loads to be dimensioned also being reduced, with the result that an altogether more cost-effective design can be realized. Furthermore, the tightening of the longitudinal bolts on the side of the rotor blade results in the achievement of a significant simplification of the mounting process, which not only reduces the expenditure of time for the mounting but also improves the ergonomics for an installer during the mounting.

The rotor blade extends from the blade tip to the face side. The blade tip is to be understood as being in particular that end of the rotor blade which, in the mounted state, is averted from the hub. The face side is that end of the rotor blade which is arranged opposite the blade tip and faces the hub.

The hub has the blade-fastening element, wherein the blade-fastening element is, for example, arranged on, for example screwed or welded to, the hub as a separate component or is an integral constituent part of the hub. The blade-fastening element may be designed for example as a blade adapter and/or blade bearing. The blade-fastening element preferably has a rotor-blade side which, in the mounted state, faces the rotor blade to be mounted thereon. The blind hole for receiving the longitudinal bolt for the fastening of the rotor blade to the blade-fastening element is preferably arranged on the rotor-blade side of the blade-fastening element. The blind hole preferably has an inner thread, so that the longitudinal bolt can be screwed into place within the blind hole by way of a corresponding outer thread. Furthermore, further possibilities for fastening between the blind hole and the longitudinal bolt are also possible. In particular, it is preferred that the longitudinal bolt is arranged at the blind hole in a force- and/or form-fitting manner. Preferably, the longitudinal bolt is fastened in the blind hole by means of a transverse bolt. Furthermore, it may be preferred that the longitudinal bolt is fastened at the blind hole by means of a dovetail connection.

The fastening region is arranged on the face side of the rotor blade. The fastening region is preferably a part of or forms a root region of the rotor blade. The fastening region preferably has a cross section whose surface normal is oriented substantially parallel to the longitudinal axis of the rotor blade. Said cross section preferably has a circular geometry. Furthermore preferably, said cross section may also have a half-round and/or elliptical and/or angular and/or polygonal geometry. Furthermore, the fastening region forms an outer circumferential surface and an inner circumferential surface. A thickened portion is arranged at the outer circumferential surface and/or at the inner circumferential surface. The thickened portion(s) is/are to be understood as being in particular an extension to an existing wall of the fastening region. The thickened portions preferably thicken said wall in particular in a radial direction. The thickened portion does not, however, necessarily have to be formed as a separate component which is arranged on the wall of the rotor blade. The thickened portion and the wall may also be formed in an integral manner. The thickened portion is consequently to be understood as being in particular that region of the fastening region which is thickened relative to the rest of the wall of the rotor blade.

The at least one thickened portion is extended through by the longitudinal bolt cutout, in the form of a passage opening, with two opposite ends. A passage opening is to be understood as being in particular an opening which has at least one first entry opening and one second entry opening, wherein the first and second entry openings are connected to one another via a passage. The passage opening is to be understood in particular as contrasting with a blind hole, which generally has only one entry opening and, at the end opposite the opening, has a closed or terminal end. The passage opening extending through the thickened portion preferably has an entry opening at its first end and a further entry opening at the second end, which is opposite the first end.

Preferably, the longitudinal bolt cutout extends exclusively through the thickened portion, wherein a longitudinal bolt axis is furthermore preferably oriented substantially parallel to the passage direction of the fastening region. Alternatively preferably, the longitudinal bolt cutout extends through the thickened portion and through further adjacent regions. The first end of the longitudinal bolt cutout is arranged on the face side of the rotor blade. The first end is arranged on the face side of the rotor blade in particular in such a way that, here, an opening which allows a longitudinal bolt to enter the longitudinal bolt cutout is formed.

For the fastening of the rotor blade to the blade-fastening element, a longitudinal bolt is arranged in the blind hole and in the longitudinal bolt cutout. Preferably, the longitudinal bolt is screwed in place in the blind hole. In particular, the longitudinal bolt is in the form of a threaded bolt which has a thread and/or which has, regionally, two or more threads. The longitudinal bolt cutout preferably has a diameter of a greater dimension than a diameter of the longitudinal bolt. In particular, it is preferred that the diameter of the longitudinal bolt cutout is greater than the diameter of the longitudinal bolt by 5% and/or 10% and/or 20% and/or 30% and/or 40% and/or 50% and/or 75% and/or 100%. Preferably, on the side of the longitudinal bolt cutout, the longitudinal bolt is secured by a nut and/or by an expansion sleeve.

The rotor allows the connecting point between the hub and the rotor blade to be formed to be significantly more compact. In particular, the arrangement of blind holes in the blade-fastening element makes it unnecessary, for the fastening of the rotor blade, to arrange passage holes through the blade-fastening element. With the passage holes in the blade-fastening element that are known in the prior art, it is inherently necessary for the blade-fastening elements to be of wider form. This is due in particular to the fact that the passage holes have to be guided laterally past rolling bodies. With the arrangement of the blind holes, despite a bearing groove which is generally to be arranged, a more compact design can be made possible. Furthermore, the strength and thus also the load-bearing capacity of the blade-fastening element are increased. However, the passage holes on the side of the rotor blade have no or at least slight disadvantages. They even offer advantages to the extent that the mounting of the rotor is simplified. Furthermore, the maintenance of the rotor blade is highly simplified since, then, the rotor blade can be moved into a 12 o'clock position and the bolts can be controlled vertically from above.

In a preferred embodiment variant of the rotor, it is provided that the fastening region has a tapering portion on a face side-averted side of the thickened portion, wherein the tapering portion preferably tapers from a face side-facing end to a face side-averted end. The tapering portion preferably has a cross section whose surface orthogonal is oriented parallel to a tangential direction of the fastening region. Said cross section preferably has a triangular geometry and/or a geometry sectionally similar to a triangle. In the case of a triangular geometry, it is particularly preferred that a first cathetus adjoins the wall and a second cathetus adjoins the thickened portion. It is in particular preferred that the hypotenuse of the triangle has a straight and/or concave and/or convex geometry.

It may furthermore be preferred that the fastening region, in particular the thickened portion and/or the tapering portion, are matched to a blade contour of the rotor blade. For example, in the case of rotor blades with a reflexed camber profile, a one-sided configuration of the fastening region, in particular the thickened portion and/or the tapering portion, may be preferred.

It is in particular preferred that the tapering portion has a fastening cutout which extends from a first end to a second end. It is furthermore preferred that a second end of the longitudinal bolt cutout and a first end of the fastening cutout adjoin one another, and/or a first end of the longitudinal bolt cutout and a blind hole opening of the blind hole adjoin one another. The direct arrangement of the longitudinal bolt cutout against the fastening cutout results in particular in the longitudinal bolt cutout being able to be formed as a guide portion for the longitudinal bolt and the fastening cutout being able to be used for the fastening of the longitudinal bolt. It is furthermore in particular preferred that the longitudinal bolt cutout and the fastening cutout form a passage. A passage formed by the longitudinal bolt cutout and the fastening cutout may be used for guiding through the longitudinal bolt.

A further preferred development of the rotor is distinguished in that a surface normal of an opening cross section of a second end of the fastening cutout and a surface normal of an opening cross section of a first end of the fastening cutout include an angle, and/or a surface normal of an opening cross section of a second end of the fastening cutout and a longitudinal axis of the fastening cutout include an angle. This arrangement arises for example in the case of an above-described triangular geometry of the cross section of the tapering portion, which comprises the fastening cutout.

It is furthermore preferred that a diameter of the fastening cutout is greater than a diameter of the longitudinal bolt cutout. In particular, it is preferred that the longitudinal bolt cutout has a longitudinal cutout cross section whose surface normal is oriented substantially orthogonally with respect to a longitudinal cutout axis, and/or the fastening cutout has a fastening cutout cross section whose surface normal is oriented substantially orthogonally with respect to a fastening cutout axis, wherein an extent, in particular a diameter, of the fastening cutout cross section is greater than an extent, in particular a diameter, of the longitudinal cutout cross section, wherein the extent, in particular the diameter, of the fastening cutout cross section is greater than the extent, in particular the diameter, of the longitudinal cutout cross section preferably by more than 5% and/or 10% and/or 20% and/or 30% and/or 40% and/or 50% and/or 75% and/or 100% and/or 200% and/or 300%. It is furthermore preferred that the surface normal of the longitudinal cutout cross section and the surface normal of the fastening cutout cross section are arranged so as to be parallel, in particular coaxial.

The longitudinal bolt diameter preferably determines the diameter of the longitudinal bolt cutout. Preferably, the longitudinal bolt diameter has a smaller value than the diameter of the longitudinal bolt cutout. In particular, the diameter of the longitudinal bolt cutout is to be set in such a way that a longitudinal bolt is guided by the longitudinal bolt cutout and can be guided through the latter. The diameter of the fastening cutout is determined in particular by a size of a fastening element for the longitudinal bolt, and/or of a nut, and/or of an expansion sleeve, and/or of an outer tool diameter. The diameter of the fastening cutout is preferably configured in such a way that an operator can, by means of a tool, insert a nut and/or a fastening element into the fastening cutout and connect it/them there to the longitudinal bolt. In particular, it is preferred that the extent, in particular the diameter, of the fastening cutout cross section is configured in such a way that a fastening tool can be inserted into the fastening cutout. The tool may for example be an open-end wrench and/or a box wrench and/or a pipe wrench and/or a torque wrench and/or a clamping cylinder and/or a rotation angle-controlled tightening procedure tool.

According to a further preferred embodiment variant of the rotor, it is provided that the fastening cutout, in particular a diameter of the fastening cutout, is arranged and configured for receiving a counterpart, in particular a nut, for connection to the longitudinal bolt and/or to an intermediate piece, for example a washer. Furthermore, it may be advantageous if the fastening cutout, in particular a diameter of the fastening cutout, is arranged and configured for receiving a tool portion for manipulating a counterpart, in particular a nut, for connection to the longitudinal bolt.

In a preferred development of the rotor, it is provided that the thickened portion and preferably the tapering portion is/are of annular form. The annular thickened portion preferably has a passage direction which is oriented substantially parallel to and also preferably coaxially with respect to the passage direction of the fastening region. The annular thickened portion may have a conical, tapered, frustoconical and/or cylindrical form or have one or more conical, tapered, frustoconical and/or cylindrical portions. The annular thickened portion may have, preferably in a plane orthogonal to the passage direction, a cross section and/or outer circumference that is circular, elliptical, oval, etc. The annular thickened portion is furthermore preferably, as described above, arranged at the outer circumferential surface and/or at the inner circumferential surface. Furthermore, the annular tapering portion is likewise characterized by a passage direction which is oriented substantially parallel to and also preferably coaxially with respect to the passage direction of the fastening region and/or of the thickened portion.

In a further particularly preferred embodiment variant of the rotor, it is provided that, on a bearing side, which is averted from the rotor-blade side, the blade-fastening element has a bearing groove with a groove width, with a groove base surface, with an outer groove side surface and inner groove side surface and with a groove opening. The bearing groove preferably has at least one channel in which rolling bodies can move. Furthermore, it is preferred that the groove base is spaced apart from a blind hole base in an axial direction, and/or a radial spacing between the outer groove side surface and a blind hole axis is smaller than twice the blind hole diameter, and/or a radial spacing between the inner groove side surface and a blind hole axis is smaller than twice the blind hole diameter, and/or a blind hole longitudinal axis intersects the groove base. In particular, it is preferred that the radial spacing between the outer groove side surface and a blind hole axis is measured in a radially outward direction. Furthermore, it is preferred that the radial spacing between the inner groove side surface and a blind hole axis is measured in a radially inward direction. Furthermore, it is preferred that the aforementioned radial spacings are formed to be smaller than 1.5 times and/or 1.3 times and/or 1 times and/or 0.75 times and/or 0.5 times the blind hole diameter.

Furthermore, it may be preferred that a surface normal of the groove base is oriented substantially parallel to a blind hole axis and/or to a passage direction of the fastening portion and/or to a rotor-blade longitudinal axis. Also, it may be preferred that a surface normal of the outer groove side surface and/or of the inner groove side surface is oriented substantially parallel to the radial direction.

In a further preferred development of the rotor, it is provided that said rotor comprises an outer blind hole, which faces the outer circumferential surface of the blade-fastening element, and has an inner blind hole, which is averted from the outer circumferential surface of the blade-fastening element, wherein the outer blind hole and the inner blind hole are arranged on the rotor-blade side, and wherein a blind hole axis of the outer blind hole and a blind hole axis of the inner blind hole are spaced apart in a radial direction by a blind hole spacing. The blind hole axes are preferably oriented so as to be parallel to a passage direction of the fastening region and/or to a rotor-blade longitudinal axis.

Furthermore, it is preferred that the blind hole spacing has a smaller dimension than the groove width, or the blind hole spacing corresponds to the groove width, or the blind hole spacing has a greater dimension than the groove width, wherein preferably, the blind hole spacing corresponds at most to 105% of the groove width. Furthermore preferably, said spacing is smaller than 110% and/or smaller than 120% and/or smaller than 130% and/or smaller than 140% and/or smaller than 150%. In particular, it is preferred that, in their extension, the blind hole axes pass through the bearing groove and/or intersect the groove base.

In a further preferred embodiment variant of the rotor, it is provided that said rotor has an expansion sleeve with a sleeve outer circumferential surface and a sleeve inner circumferential surface, wherein an expansion sleeve thread is arranged at least sectionally on the sleeve inner circumferential surface, wherein the expansion sleeve is arranged coaxially with respect to the longitudinal bolt cutout and/or with respect to the fastening cutout, with its end that faces the face side against an abutment point, preferably against a transverse bolt, wherein the longitudinal bolt has a longitudinal bolt thread which corresponds to the expansion sleeve thread, and wherein the longitudinal bolt is screwed to the expansion sleeve.

Furthermore preferably, it is provided that the rotor blade has in the fastening region a transverse bolt cutout which extends substantially radially with respect to a passage direction of the fastening region, a transverse bolt with a transverse bolt opening is arranged in the transverse bolt cutout, the transverse bolt opening forms a part of the longitudinal bolt cutout, and the longitudinal bolt extends through the transverse bolt opening. In particular, it is preferred that the transverse bolt cutout and/or the transverse bolt are/is arranged at the thickened portion, in particular at the face side-averted end of the thickened portion. It is furthermore preferred that the transverse bolt cutout and/or the transverse bolt adjoin(s) the tapering portion, and/or the transverse bolt cutout and/or the transverse bolt are/is arranged at the tapering portion, in particular at the face side-facing end of the tapering portion. It is furthermore preferred that the rotor is developed to the extent that the transverse bolt cutout and/or the transverse bolt are/is arranged sectionally at the thickened portion and sectionally at the tapering portion. It is in particular preferred that the blind hole, the longitudinal bolt cutout and the transverse bolt opening have a common passage axis.

A further particularly preferred embodiment variant of the rotor provides that the at least one rotor blade comprises two or more thickened portions and/or two or more tapering portions and/or two or more longitudinal bolt cutouts and/or two or more fastening cutouts and/or two or more transverse bolt cutouts and/or two or more transverse bolts and/or two or more expansion sleeves, and/or the blade-fastening element comprises two or more blind holes. It is furthermore possible for there to be provided at least one longitudinal bolt cutout in the form of an elongate hole, which is arranged to receive at least two longitudinal bolts.

Furthermore, it is preferred that the two or more thickened portions and/or two or more tapering portions and/or two or more longitudinal bolt cutouts and/or two or more fastening cutouts and/or two or more transverse bolt cutouts and/or two or more transverse bolts and/or two or more expansion sleeves are arranged, preferably in each case equidistantly, along a circumference of the fastening region. The arrangement may also be selected in a load-dependent manner, for example by way of a relatively dense arrangement in the highly loaded region and a less dense arrangement in the less loaded region.

It is in particular preferred that the rotor comprises an inner thickened portion and preferably an inner tapering portion, which is/are arranged at the inner circumferential surface. It is furthermore preferred that the rotor comprises an outer thickened portion and preferably an outer tapering portion, which is/are arranged at the outer circumferential surface. Furthermore, an inner longitudinal bolt cutout may extend through the inner thickened portion and/or an outer longitudinal bolt cutout may extend through the outer thickened portion. Furthermore, it is preferably the case that an inner fastening cutout extends through the inner tapering portion and an outer fastening cutout extends through the outer tapering portion.

A further preferred development of the rotor is distinguished in that the blade-fastening element is a hub adapter and/or a blade flange bearing.

According to a further aspect, provided is a rotor blade for a wind turbine that extends from a blade tip to a face side and that comprises a fastening region which is of tubular form and which is arranged adjoining the face side and which serves for the fastening of the rotor blade to a blade-fastening element of a rotor hub, wherein at least one thickened portion is arranged at an outer circumferential surface and/or at an inner circumferential surface of the fastening region, the at least one thickened portion being extended through by a longitudinal bolt cutout, in the form of a passage opening, with two opposite ends, wherein a first end is arranged at the face side.

In particular, it is preferred that the fastening region has a tapering portion on a face side-averted side of the thickened portion, wherein the tapering portion preferably tapers from a face side-facing end to a face side-averted end. In a further preferred development of the rotor blade, it may be provided that the tapering portion has a fastening cutout which extends from a first end to a second end.

It is furthermore preferred that a second end of the longitudinal bolt cutout and a first end of the fastening cutout adjoin one another, and/or a first end of the longitudinal bolt cutout and a blind hole opening adjoin one another. It is in particular preferred that the longitudinal bolt cutout and the fastening cutout form a passage. In a further preferred development of the rotor blade, it is provided that a surface normal of an opening cross section of a second end of the fastening cutout, which second end faces the rotor blade tip, and a surface normal of an opening cross section of a first end of the fastening cutout include an angle. Furthermore, the rotor blade may preferably be developed in such a way that a surface normal of an opening cross section of the second end of the fastening cutout and a longitudinal axis of the fastening cutout include an angle.

It is furthermore preferred that a diameter of the fastening cutout is greater than a diameter of the longitudinal cutout. Furthermore, it is preferably provided that the fastening cutout, in particular a diameter of the fastening cutout, is arranged and configured for receiving a counterpart, in particular a nut, for connection to the longitudinal bolt. It is furthermore preferred that the fastening cutout, in particular a diameter of the fastening cutout, is arranged and configured for receiving a tool portion for manipulating a counterpart, in particular a nut, for connection to the longitudinal bolt. Furthermore, it may be provided that the thickened portion and preferably the tapering portion is/are of annular form.

In a preferred embodiment variant of the rotor blade, it is provided that the rotor blade has in the fastening region a transverse bolt cutout which extends substantially radially with respect to a passage direction of the fastening region, a transverse bolt with a transverse bolt opening is arranged in the transverse bolt cutout, the transverse bolt opening forms a part of the longitudinal bolt cutout, and the longitudinal bolt extends through the transverse bolt opening. Furthermore, it is preferred that the transverse bolt cutout and/or the transverse bolt are/is arranged at the thickened portion, in particular at the face side-averted end of the thickened portion. Furthermore, it may be preferred that the transverse bolt cutout and/or the transverse bolt adjoin(s) the tapering portion, and/or the transverse bolt cutout and/or the transverse bolt are/is arranged at the tapering portion, in particular at the face side-facing end of the tapering portion. A further development of the rotor blade provides that the transverse bolt cutout and/or the transverse bolt are/is arranged sectionally at the thickened portion and sectionally at the tapering portion. It is furthermore preferred that the transverse bolt cutout is in the form of a passage hole. Alternatively preferably, the transverse bolt cutout may also be in the form of a blind hole. For simplifying the mounting of the rotor blade, it may furthermore be preferable that the longitudinal bolt cutout and the transverse bolt opening have a common passage axis.

In a further preferred embodiment variant of the rotor blade, it is provided that said rotor blade comprises two or more thickened portions and/or two or more tapering portions and/or two or more longitudinal bolt cutouts and/or two or more fastening cutouts and/or two or more transverse bolt cutouts and/or two or more transverse bolts and/or two or more expansion sleeves. Furthermore, it may be preferred that the two or more thickened portions and/or two or more tapering portions and/or two or more longitudinal bolt cutouts and/or two or more fastening cutouts and/or two or more transverse bolt cutouts and/or two or more transverse bolts and/or two or more expansion sleeves are arranged, preferably in each case equidistantly, along a circumference of the fastening region.

According to a further aspect, provided is a rotor blade segment for a rotor blade for a wind turbine that extends from a blade end to a fastening side and that comprises a fastening region which is of tubular form and which is arranged adjoining the fastening side and which serves for the fastening of the rotor blade segment to a further rotor blade segment for the purpose of forming a rotor blade, wherein at least one thickened portion is arranged at an outer circumferential surface and/or at an inner circumferential surface of the fastening region, the at least one thickened portion being extended through by a longitudinal bolt cutout, in the form of a passage opening, with two opposite ends, wherein a first end is arranged at the fastening side.

This embodiment is based inter alia on the realization that that here for the fastening of a rotor blade to a hub of a rotor for a wind turbine can be used equally for a two-part, in particular longitudinally split, rotor blade. A rotor blade may preferably comprise two rotor blade segments, which each have a blade end and a fastening side and are fastened to one another at the two fastening sides, which face one another. This fastening and the preferred configurations and developments thereof can preferably correspond to that here for the fastening of a rotor blade to a hub of a rotor for a wind turbine and the preferred configurations and developments thereof. The end of a rotor blade segment may for example be a blade tip. The end of a rotor blade segment may also be an end close to the hub. Such an end of a rotor blade segment close to the hub may preferably have a face side, which corresponds to the face side described for the fastening of a rotor blade to a hub of a rotor for a wind turbine.

According to a further aspect, provided is a blade-fastening element for the fastening of a rotor blade, in particular a rotor blade according to one of the above-described embodiment variants, to a hub of a rotor for a wind turbine that comprises a blind hole for receiving a longitudinal bolt for the fastening to the blade-fastening element of a rotor blade, in particular a rotor blade according to one of the above-described embodiment variants.

The blade-fastening element is preferably developed in that, on a bearing side, which is averted from the rotor-blade side, there is arranged a bearing groove with a groove width, with a groove base surface, with an outer groove side surface, which faces an outer circumferential surface of the blade-fastening element, and inner groove side surface, which faces an inner circumferential surface of the blade-fastening element, and with a groove opening. It is furthermore preferred that the groove base is spaced apart from a blind hole base in an axial direction. Furthermore preferably, a radial spacing between the outer groove side surface and a blind hole axis is smaller than twice the blind hole diameter, and/or a radial spacing between the inner groove side surface and a blind hole axis is smaller than twice the blind hole diameter. It is furthermore preferred that a blind hole longitudinal axis intersects the groove base.

According to a further preferred embodiment variant of the blade-fastening element, it is provided that the latter has an annular geometry, with a tangentially oriented annular direction, with a thickness parallel to the longitudinal direction of the rotor blade and extending from a bearing side, which is averted from the rotor blade, to a rotor-blade side, which faces the rotor blade, and with a width oriented in the radial direction orthogonally with respect to the annular direction and orthogonally with respect to the thickness, wherein a bearing groove encircling in the annular direction is arranged on the bearing side.

It is furthermore preferred that a spacing between the outer groove side surface and the outer circumferential surface of the blade-fastening element and/or a spacing between the inner groove side surface and the inner circumferential surface of the blade-fastening element has a smaller dimension than a spacing between a blind hole axis of the blind hole and the outer circumferential surface of the blade-fastening element and/or the inner circumferential surface of the blade-fastening element. It is furthermore preferred that the groove base surface, which faces the rotor-blade side, is, in the direction of the thickness, spaced apart by a spacing from an end of the blind hole that faces the hub side, wherein the spacing is preferably smaller than 90% and/or smaller than 80% and/or smaller than 70% and/or smaller than 60% and/or smaller than 50% and/or smaller than 40% and/or smaller than 30% and/or smaller than 20% and/or smaller than 10% and/or smaller than 5% of the thickness of the blade-fastening element. It is furthermore preferred that the groove width has an extent smaller than 90% and/or smaller than 80% and/or smaller than 70% and/or smaller than 60% and/or smaller than 50% and/or smaller than 40% and/or smaller than 30% and/or smaller than 20% and/or smaller than 10% and/or smaller than 5% of the width of the blade-fastening element.

A further preferred development of the blade-fastening element is distinguished in that said blade-fastening element comprises an outer blind hole, which faces the outer circumferential surface of the blade-fastening element, and comprises an inner blind hole, which is averted from the outer circumferential surface of the blade-fastening element, wherein the outer blind hole and the inner blind hole are arranged on the rotor-blade side, and wherein a blind hole axis of the outer blind hole and a blind hole axis of the inner blind hole are spaced apart in a radial direction by a blind hole spacing.

Furthermore, it is preferred that the blind hole spacing has a smaller dimension than the groove width, or the blind hole spacing corresponds to the groove width, or the blind hole spacing has a greater dimension than the groove width, wherein preferably, the blind hole spacing corresponds at most to 105% of the groove width. It is furthermore preferred that the blade-fastening element comprises two or more blind holes. In a further preferred development of the blade-fastening element, it is provided that the latter is a hub adapter or a blade flange bearing.

According to a further aspect, provided is a wind turbine comprising a rotor according to at least one of the above-described embodiment variants and/or a rotor blade according to at least one of the above-described embodiment variants and/or a blade-fastening element according to at least one of the above-described embodiment variants.

According to a further aspect, provided is a method for mounting a rotor according to at least one of the above-described embodiment variants, and/or for fastening a rotor blade according to the above-described aspect to a blade-fastening element according to the above-described aspect, comprising providing a rotor blade according to the above-described aspect, providing a blade-fastening element according to the above-described aspect, fastening a longitudinal bolt in the blind hole of the blade-fastening element, in particular by means of screwing-in, leading that portion of the longitudinal bolt which projects from the blind hole through the longitudinal bolt cutout, wherein the face side of the rotor blade at least sectionally abuts against a rotor-blade side of the blade-fastening element, and fastening in the region of the fastening cutout, preferably through attachment of a counterpart, an end of the longitudinal bolt that projects from the longitudinal bolt cutout.

The attachment of the counterpart is preferably carried out by means of a tool. It is in particular preferred that the counterpart is a nut which is screwed onto the longitudinal bolt by means of a tool. Preferably, the method comprises the step of fastening in the region of the fastening portion, preferably through attachment of a counterpart, an end of the longitudinal bolt that projects from the longitudinal bolt cutout. The counterpart is preferably in the form of a nut, wherein the nut is screwed onto the longitudinal bolt by means of a tool. The counterpart may also be in the form of an expansion sleeve, in particular in the form of an expansion sleeve with a thread. It is furthermore preferred that the method comprises the step of arranging the transverse bolt in the fastening region in a transverse bolt cutout which extends substantially radially with respect to the rotor-blade longitudinal axis, and of orienting the transverse bolt in such a way that the transverse bolt passage direction of the transverse bolt opening is arranged substantially parallel to the passage direction. Furthermore, it may be preferred that, at that end of the longitudinal bolt which is averted from the blade-fastening element, an expansion sleeve is arranged and is screwed against an abutment point, wherein the abutment point is preferably a circumferential surface of the transverse bolt.

The methods described herein have features or method steps that make them particularly suitable for being used for a rotor and/or a rotor blade according to the above-described aspects, and/or for a blade-fastening element according to the above-described aspect, and their respective developments. For further advantages, design variants and design details of these further aspects and their possible developments, reference is also made to the description given above concerning the corresponding features and developments of the rotor.

BRIEF DESCRIPTION OF THE SEVERAL VIEWS OF THE DRAWINGS

Preferred embodiments of the invention will be discussed by way of example on the basis of the appended figures. In the figures.

In the figures, identical or substantially functionally identical or similar elements are denoted by the same reference signs.

DETAILED DESCRIPTION

Figure 1:
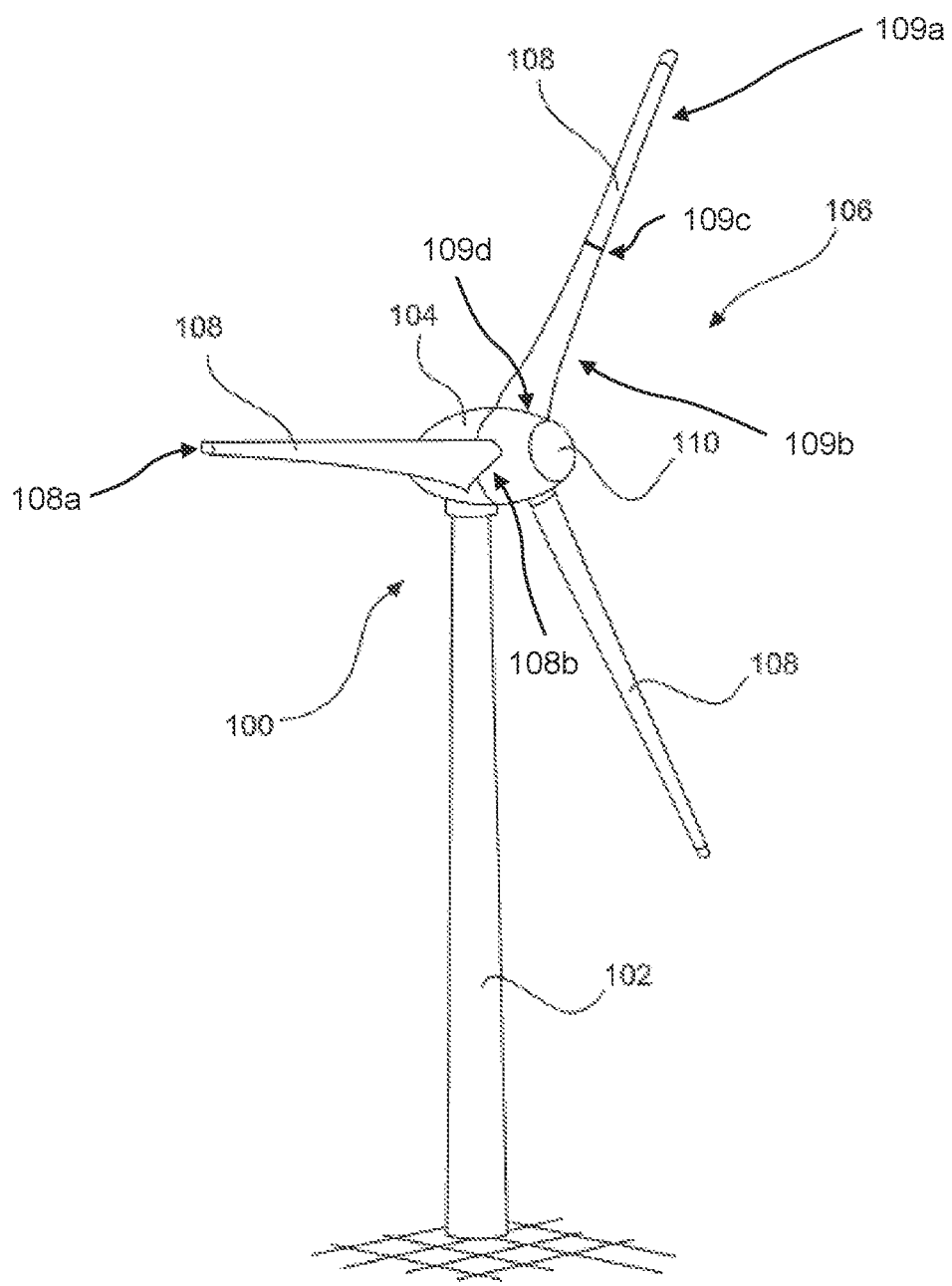
FIG. 1 shows a schematic three-dimensional view of an exemplary embodiment of a wind turbine.

FIG. 1 shows a schematic three-dimensional view of an exemplary embodiment of a wind turbine. FIG. 1 shows in particular a wind turbine 100 with a tower 102 and with a nacelle 104. A rotor 106 having three rotor blades 108 and having a spinner 110 is arranged on the nacelle 104. During operation, the rotor 106 is set in rotational motion by the wind and in this way drives a generator in the nacelle 104.

At least one of the rotor blades 108 of the rotor 106 extends from a blade tip 108a to a face side 108b, wherein the rotor blade 108 has a fastening region which is of tubular form and which is arranged adjoining the face side 108b, wherein the fastening region has at its outer circumferential surface and/or at its inner circumferential surface at least one thickened portion, wherein the at least one thickened portion is extended through by a longitudinal bolt cutout, in the form of a passage opening, with two opposite ends, wherein a first end of the longitudinal bolt cutout is arranged on the face side 108b of the rotor blade 108. The rotor 106 furthermore comprises a hub having a blade-fastening element which, at the rotor-blade side thereof, has a blind hole for receiving a longitudinal bolt for the fastening of the rotor blade 108 to the blade-fastening element. Furthermore, a longitudinal bolt is arranged in the blind hole and in the longitudinal bolt cutout for the fastening of the rotor blade to the blade-fastening element.

Alternatively or additionally, at least one of the rotor blades 108 of the rotor 106 may be formed as a two-part, in particular (as here) longitudinally split, rotor blade having two rotor blade segments 109a, 109b. The rotor blade segment 109a extends from a blade end, specifically the blade tip, to a fastening side and comprises a fastening region which is of tubular form and which is arranged adjoining the fastening side, wherein at least one thickened portion is arranged at an outer circumferential surface and/or at an inner circumferential surface of the fastening region, the at least one thickened portion being extended through by a longitudinal bolt cutout, in the form of a passage opening, with two opposite ends, wherein a first end is arranged at the fastening side. The rotor blade segment 109b extends from a blade end, specifically the blade end close to the hub, to a fastening side and comprises a fastening region which is of tubular form and which is arranged adjoining the fastening side, wherein at least one thickened portion is arranged at an outer circumferential surface and/or at an inner circumferential surface of the fastening region, the at least one thickened portion being extended through by a longitudinal bolt cutout, in the form of a passage opening, with two opposite ends, wherein a first end is arranged at the fastening side.

The two rotor blade segments 109a, 109b together form a rotor blade. For this purpose, the two mutually facing fastening sides are fastened to one another at the rotor-blade fastening point or ends 109c.

That end of the rotor blade segment 109b which is close to the hub may preferably have a face side 109d, which corresponds to the face side 108b described for the fastening of a rotor blade to a hub of a rotor for a wind turbine.

Figure 2:
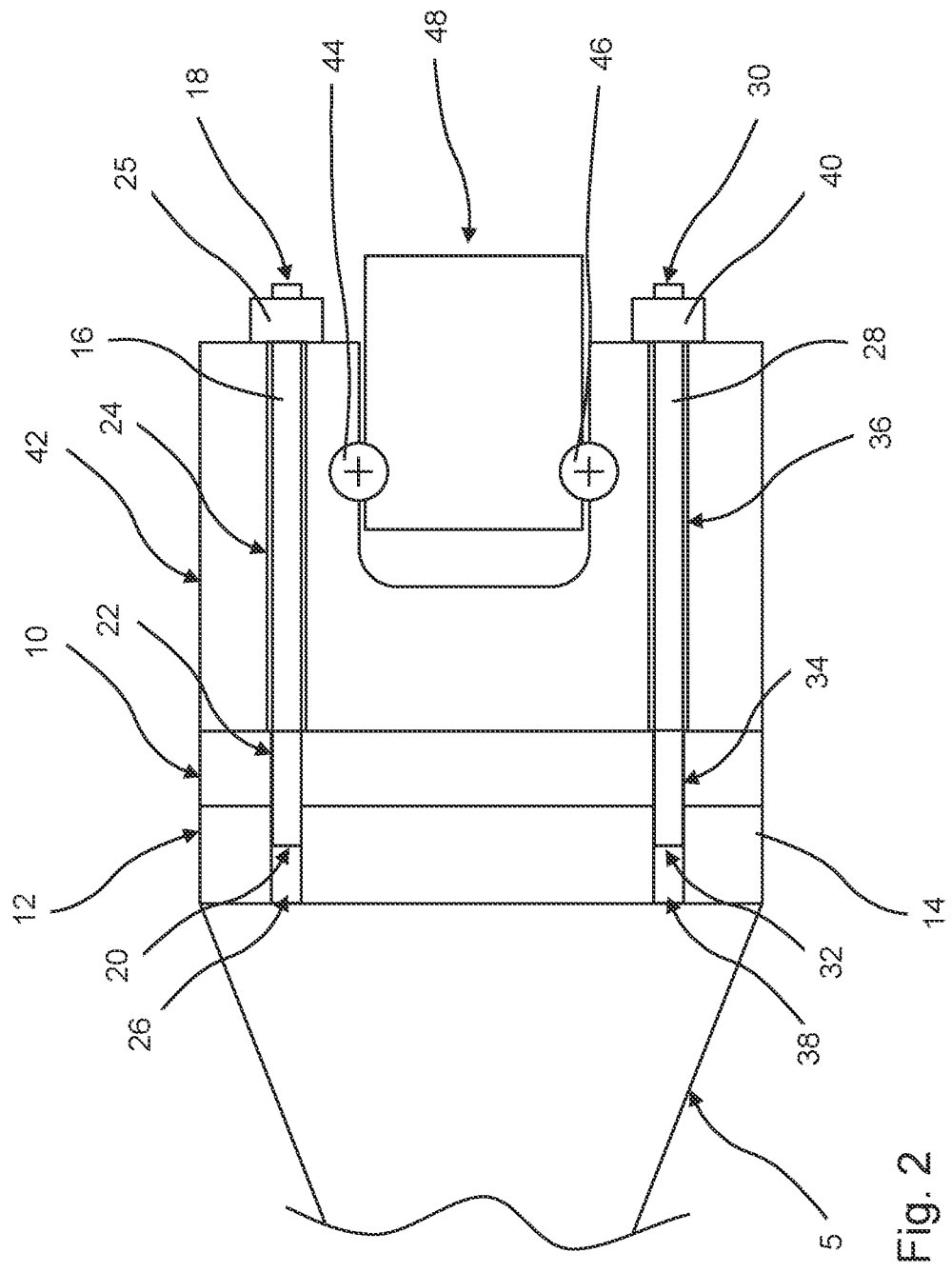
FIG. 2 shows a schematic two-dimensional view of a detail of a rotor known in the prior art.

FIG. 2 shows a schematic two-dimensional view of a detail of a rotor known in the prior art. The connecting point between the rotor blade 5 and the hub has a fastening region 10 on the side of the rotor blade 5. The rotor blade 5 adjoins a U-bearing 42 of the hub by way of the fastening region 10. The fastening region 10 has an outer rotor blade-side longitudinal bolt cutout 22. The fastening region 10 furthermore has a transverse bolt cutout 12 in which a transverse bolt 14 is arranged. Furthermore, the transverse bolt 14 has an outer transverse bolt opening 26 which, with corresponding arrangement of the transverse bolt 14 in the transverse bolt cutout 12, is arranged aligned with the outer rotor blade-side longitudinal bolt cutout 22.

The U-bearing 42 has an outer hub-side longitudinal bolt cutout 24 which, with corresponding arrangement of the rotor blade 5 on the U-bearing 42, is oriented aligned with the outer rotor blade-side longitudinal bolt cutout 22 and aligned with the outer transverse bolt opening 26. An outer longitudinal bolt 16 is arranged within the outer transverse bolt opening 26, the outer rotor blade-side longitudinal bolt cutout 22 and the outer hub-side longitudinal bolt cutout 24. The longitudinal bolt 16 preferably has at its second end 20, which faces the rotor blade, a thread. Furthermore, the transverse bolt 14 preferably has in its outer transverse bolt opening 26 an inner thread which is formed in a manner corresponding to the outer thread on the longitudinal bolt 16, so that the longitudinal bolt 16 can be screwed into the transverse bolt 12.

The longitudinal bolt extends from a first end 18, which faces the hub, to the second end 20. The longitudinal bolt 16 projects with the first end 18 out of the outer hub-side longitudinal bolt cutout 24. The longitudinal bolt 16 has an outer thread on a portion adjoining the first end 18. A nut 25 is screwed onto said outer thread, so that, by means of the screwing of the longitudinal bolt 16 into the transverse bolt 12 and by means of the screwing-on of the nut 25, a fastening of the rotor blade 5 to the U-bearing 42 is realized.

Analogously to the outer side, an inner rotor blade-side longitudinal bolt cutout 34, an inner transverse bolt opening 38 and an inner hub-side longitudinal bolt cutout 36 are arranged on an inner side of the fastening region. An inner longitudinal bolt 28 is arranged therein and extends from a first end 30 to a second end 32 in a longitudinal direction. The longitudinal direction of the longitudinal bolt 28 is substantially parallel to a longitudinal extent of the rotor blade 5 and/or to a passage direction of the fastening region 10. The longitudinal bolt 28 is screwed into a thread of the inner transverse bolt opening 38 and is secured at its first end 30 by means of a nut 40. The U-bearing 42 has a hub element 48 which is mounted in a groove of the U-bearing 42 by means of rolling bodies 44, 46.

Figure 3:
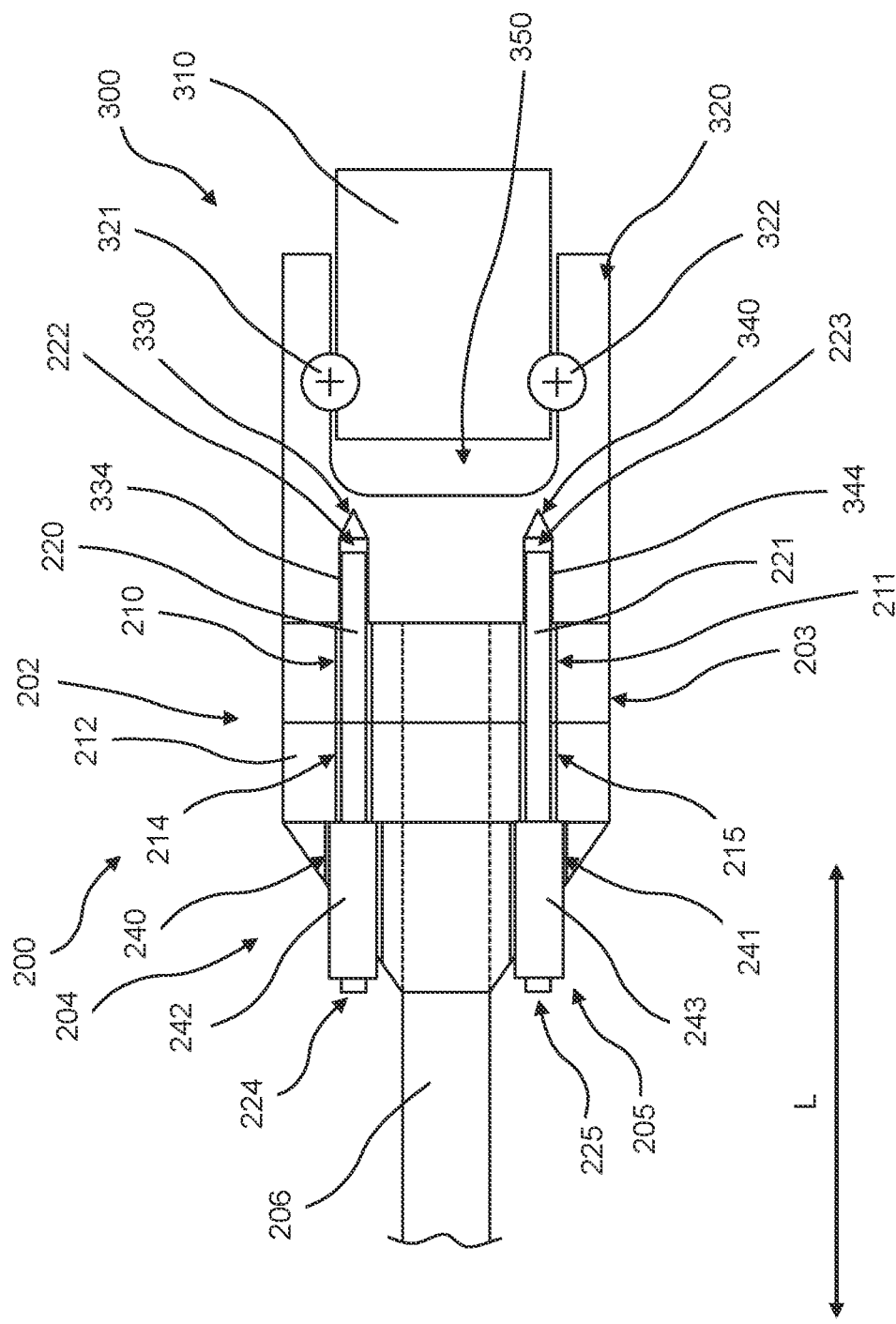
FIG. 3 shows a schematic two-dimensional view of a detail of an exemplary embodiment of a rotor.

FIG. 3 shows a schematic two-dimensional view of a detail of an exemplary embodiment of a rotor. The tubular fastening region 200 arranged on a rotor blade on a face side is shown. The fastening region 200 is arranged on a blade-fastening element 300 on a face side. FIG. 3 shows in particular a section through a wall in a radial direction of the fastening region 200. Furthermore, a part of the rotor blade wall 206 is shown on the left-hand side of the figure. The wall is thickened in the fastening region 200 in that an outer thickened portion 202 is arranged on an outer circumferential surface and an inner thickened portion 203 is arranged on an inner circumferential surface. The outer thickened portion 202 and the inner thickened portion 203 are connected integrally to the rotor blade wall 206. The rotor blade extends in particular from the fastening region 200 to a rotor blade tip (not shown) in a longitudinal direction L.

The fastening region 200 has an outer tapering portion 204 on a face side-averted side of the outer thickened portion 202, wherein the outer tapering portion 204 tapers from a face side-facing end to a face side-averted end. The outer tapering portion 204 has a cross section whose surface normal is arranged parallel to the ring direction and/or tangential direction of the fastening region 200. The cross section of the outer tapering portion 204 is triangular, wherein a first cathetus adjoins the thickened portion 202 and a second cathetus adjoins the rotor blade wall 206. The hypotenuse is in the form of a straight line.

An inner tapering portion 205 analogously adjoins the inner thickened portion 203. The tapering portions 204, 205 are connected integrally to the rotor blade wall 206 and to the respective thickened portions 202, 203. Due to the triangular geometry of the outer tapering portion 204, a surface normal of an opening cross section of a second end of the fastening cutout 240, which second end is averted from the face side, and a surface normal of an opening cross section of a first end of the fastening cutout 240 include an angle. Furthermore, a surface normal of an opening cross section of the second end of the fastening cutout 240 and a longitudinal axis of the fastening cutout 240 include an angle. It can furthermore be seen that the diameter of the fastening cutout 240 is greater than the diameter of the longitudinal bolt cutout 211.

An outer longitudinal bolt cutout 210 and an inner longitudinal bolt cutout 211 extend through the outer thickened portion 202 and the inner thickened portion 203 in each case from a first end, which is arranged on the face side, in each case to a second end, wherein the second ends of the longitudinal bolt cutouts 210, 211 adjoin the tapering portions 204, 205. A transverse bolt 212 is furthermore arranged between the longitudinal bolt cutouts 210, 211 and the tapering portions 204, 205. The transverse bolt 212 has an outer transverse bolt opening 214 and an inner transverse bolt opening 215 which extend coaxially with respect to the outer longitudinal bolt cutout 210 and the inner longitudinal bolt cutout 211, respectively. The outer transverse bolt opening 214 and inner transverse bolt opening 215 may be understood as being part of the outer longitudinal bolt cutout 210 and inner longitudinal bolt cutout 211, respectively. The second end, averted from the hub, of the outer longitudinal bolt cutout 210 and a first end, facing the hub, of the fastening cutout 240 adjoin one another.

As already described, the longitudinal bolt cutouts 210, 211 adjoin the tapering portions 204, 205 at their second ends. An outer fastening cutout 240 extends through the outer tapering portion 204 parallel to the longitudinal direction L from the second end of the outer longitudinal bolt cutout. Analogously, an inner fastening cutout 241 extends through the inner tapering portion 205 in the longitudinal direction L. The fastening cutouts 240, 241 preferably extend coaxially with respect to the longitudinal bolt cutouts 210, 211.

The blade-fastening element 300 has a U-bearing 320 and a hub element 310. The hub element 310 is mounted within a bearing groove 350 of the U-bearing 320 by means of rolling bodies 321, 322. The bearing groove 350 has two side surfaces which face the outer circumferential surface and the inner circumferential surface, a groove base which faces the rotor blade, and an open side which is averted from the rotor blade. The U-bearing 320 has a rotor-blade side which faces the face side of the rotor blade.

The U-bearing 320 has an outer blind hole 330 and inner blind hole 340 on the rotor-blade side. In the mounted state, the outer blind hole 330 is arranged coaxially with respect to the outer longitudinal bolt cutout 210. Furthermore, the inner blind hole 340 is arranged coaxially with respect to the inner longitudinal bolt cutout 211. The outer longitudinal bolt cutout 210, the outer fastening cutout 240 and the outer blind hole 330 form a passage and are arranged in a coaxial manner. The blind holes 330, 340 are spaced apart from the groove 350 in the direction of the rotor blade in the longitudinal direction L. Furthermore, the side walls of the groove 350 are spaced apart in such a way that their spacing is larger than a spacing of the blind holes 330, 340 to one another.

For the purpose of fastening the rotor blade by way of its fastening region 200 to the blade-fastening element 300, an outer longitudinal bolt 220 is arranged within the outer blind hole 330, the outer longitudinal bolt cutout 210 and the outer fastening cutout 240. The first end, facing the hub, of the longitudinal bolt cutout 210 adjoins the blind hole 330. The outer longitudinal bolt 220 extends from a first end 222 as far as a second end 224. In a region adjoining the first end 222, the outer longitudinal bolt 220 has an outer thread which is formed in a manner corresponding to an inner thread 334 of the outer blind hole 330. The outer longitudinal bolt 220 is screwed in place within the outer blind hole 330.

The outer fastening cutout 240, in particular a diameter of the fastening cutout 240, is arranged and configured for receiving a counterpart, in particular a nut or an expansion sleeve 242, for connection to the longitudinal bolt 210. The longitudinal bolt 220 has an outer thread adjoining the second end 224. An expansion sleeve 242 is furthermore screwed onto a portion adjoining the second end 224 and abuts with its end facing the blade-fastening element 300 against the transverse bolt 212. The abutment of the expansion sleeve 224 against the transverse bolt 212 and screwing of the expansion sleeve 224 onto the longitudinal bolt 220 and also the screwing of the longitudinal bolt 220 into the outer blind hole 330 give rise to a force in the longitudinal direction L acting on the longitudinal bolt 220. Said force in the longitudinal direction L results in a connection of the fastening region 200 to the blade-fastening element 300.

Analogously to the outer longitudinal bolt 220, an inner longitudinal bolt 221 extends from the inner blind hole 340 as far as the inner fastening cutout 241 through the inner longitudinal bolt cutout 211. The longitudinal bolt 221 extends from a first end 223 in the region of the blind hole to a second end 225. Analogously to the outer longitudinal bolt 220, the inner longitudinal bolt 221 is fastened by way of an outer thread in an inner thread 344 of the blind hole 340. Furthermore, the longitudinal bolt 221 is secured within the fastening cutout 241 by means of an expansion sleeve 243.

FIGS. 4 to 7 show a further schematic exemplary embodiment of a rotor blade 400, 400'. The rotor blade 400, 400' has a wall 405, wherein an outer thickened portion 425 and an inner thickened portion 445 are arranged within a fastening region 410. Furthermore, tapering portions 427, 447 are arranged on the face side-averted sides of the thickened portions 425, 445. Transverse bolt cutouts 450 are arranged within the thickened portions 425, 445 radially with respect to the rotor-blade longitudinal axis. Furthermore, transverse bolts 430 are arranged within the transverse bolt cutout 450. Furthermore, outer longitudinal bolt cutouts 428 and inner longitudinal bolt cutouts 448 are arranged within the outer and inner thickened portion 425, 445 so as to be substantially parallel to the rotor-blade longitudinal axis. An outer longitudinal bolt 420 and an inner longitudinal bolt 440 extend within said cutouts, wherein the longitudinal bolts 420, 440 extend as far as an outer fastening cutout 432 or inner fastening cutout 462. The longitudinal bolts are secured within the outer fastening cutout 432 and inner fastening cutout 462 by means of a nut 426, 446.

Figure 4:
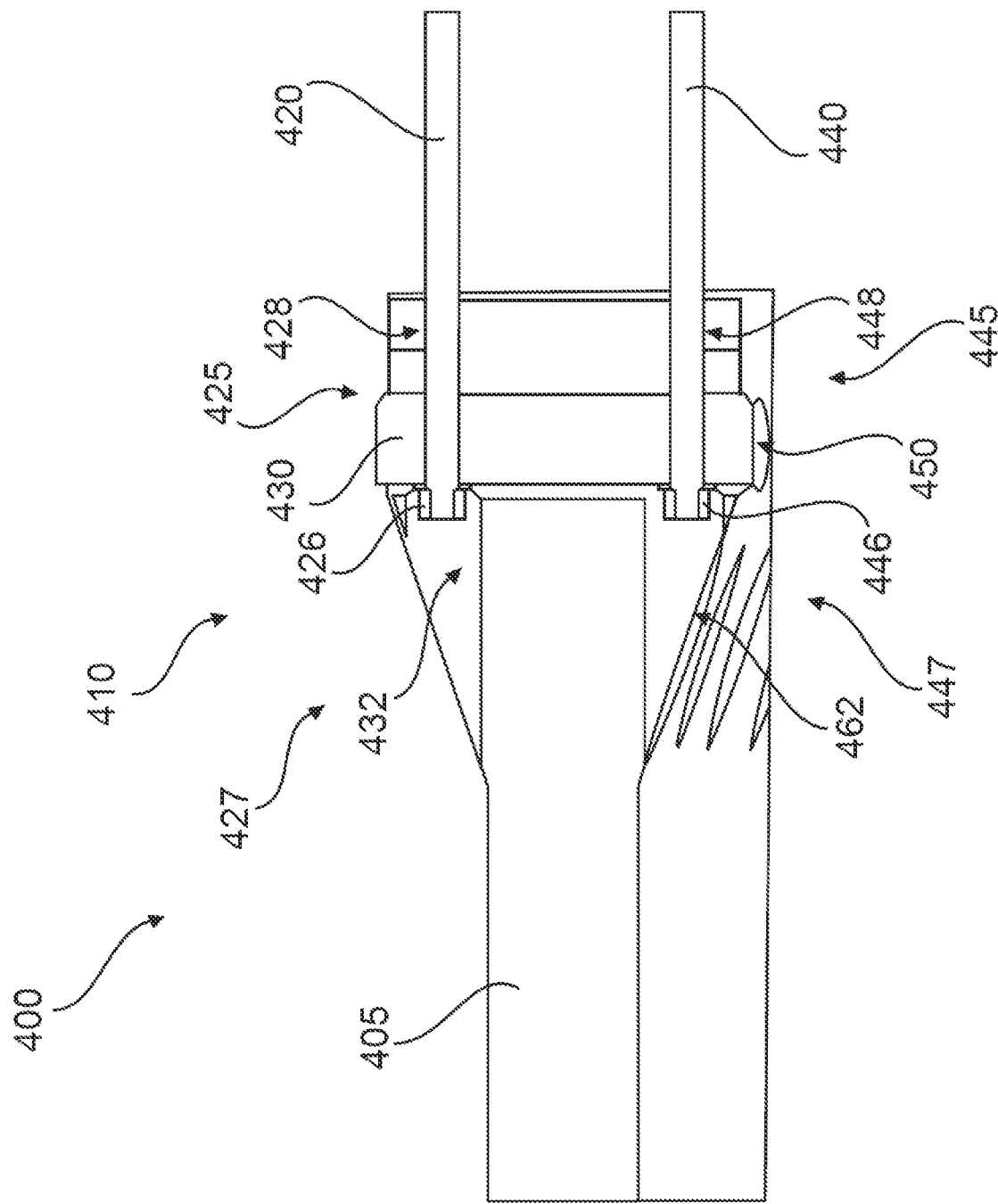
FIG. 4 shows a schematic two-dimensional partial view of an exemplary embodiment of a rotor blade.
Figure 5:
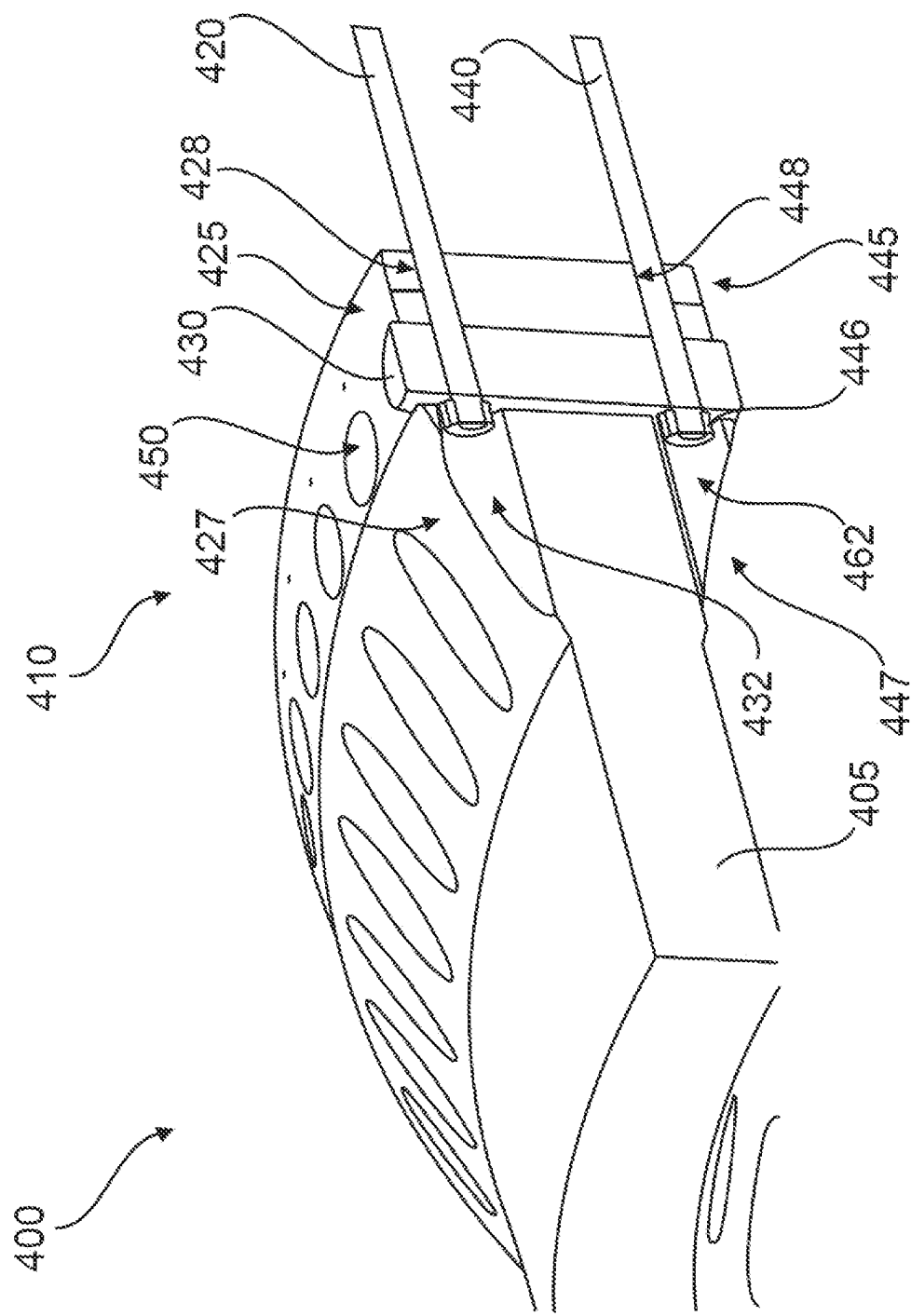
FIG. 5 shows a schematic three-dimensional partial view of the rotor blade from FIG. 4.
Figure 6:
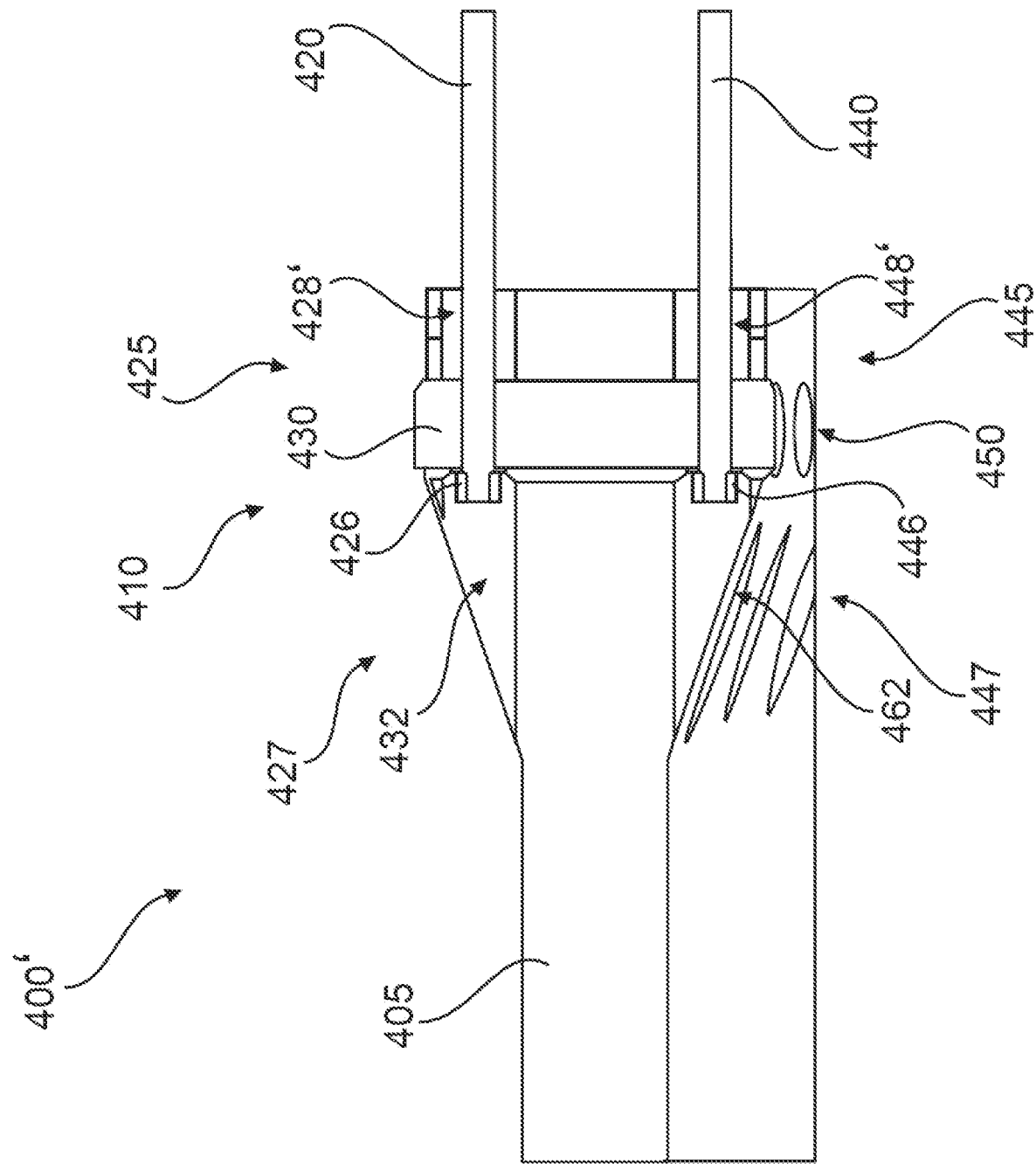
FIG. 6 shows a schematic two-dimensional partial view of a further exemplary embodiment of a rotor blade.
Figure 7:
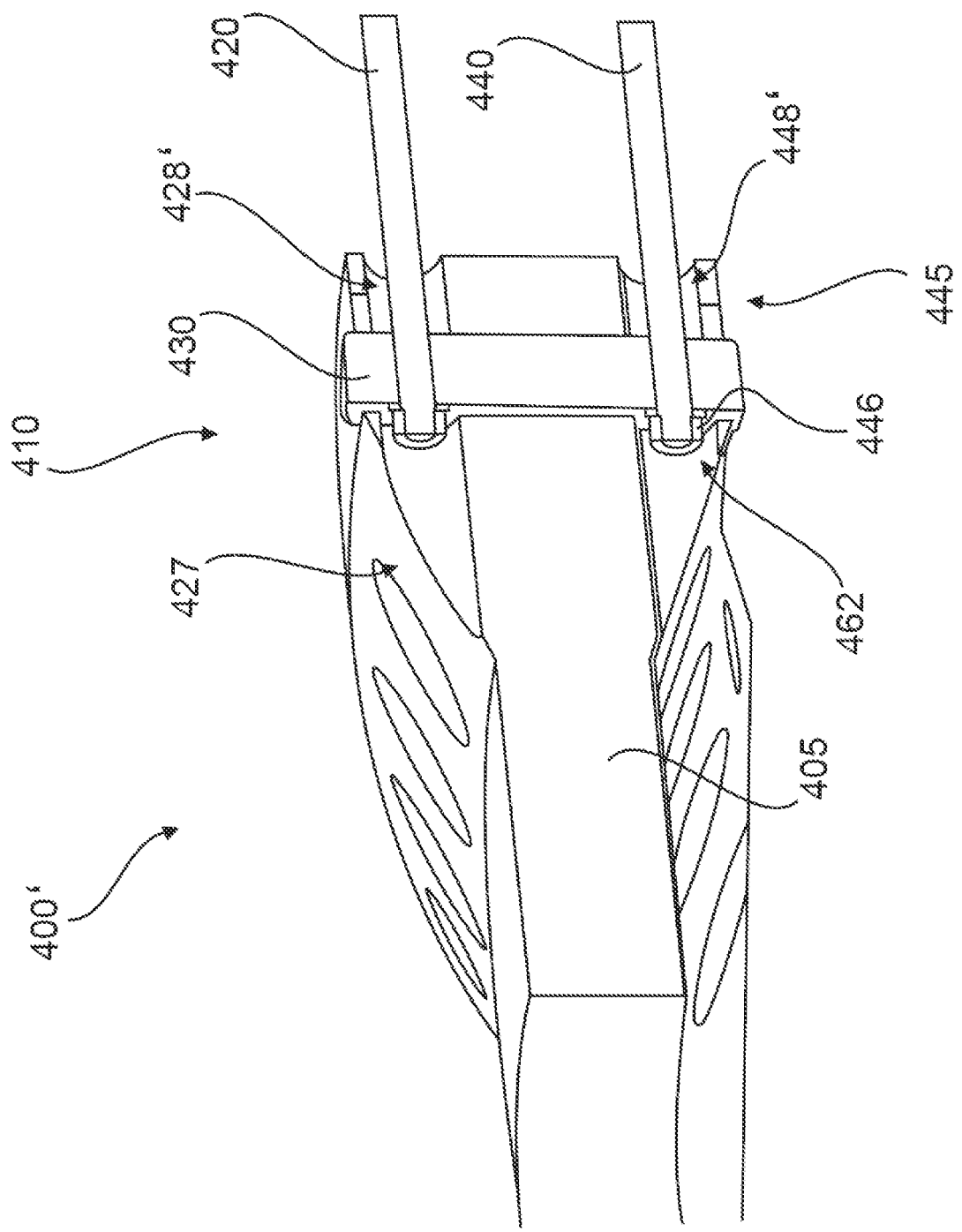
FIG. 7 shows a schematic three-dimensional partial view of the rotor blade from FIG. 6.

FIGS. 4 and 5 show that the longitudinal bolt cutouts 428, 448 have a diameter which is merely slightly greater than a diameter of the longitudinal bolts 420, 440. FIGS. 6 and 7 show longitudinal bolt cutouts 428', 448' which have a diameter which is significantly greater than a diameter of the longitudinal bolts 420, 440.

Figure 8:
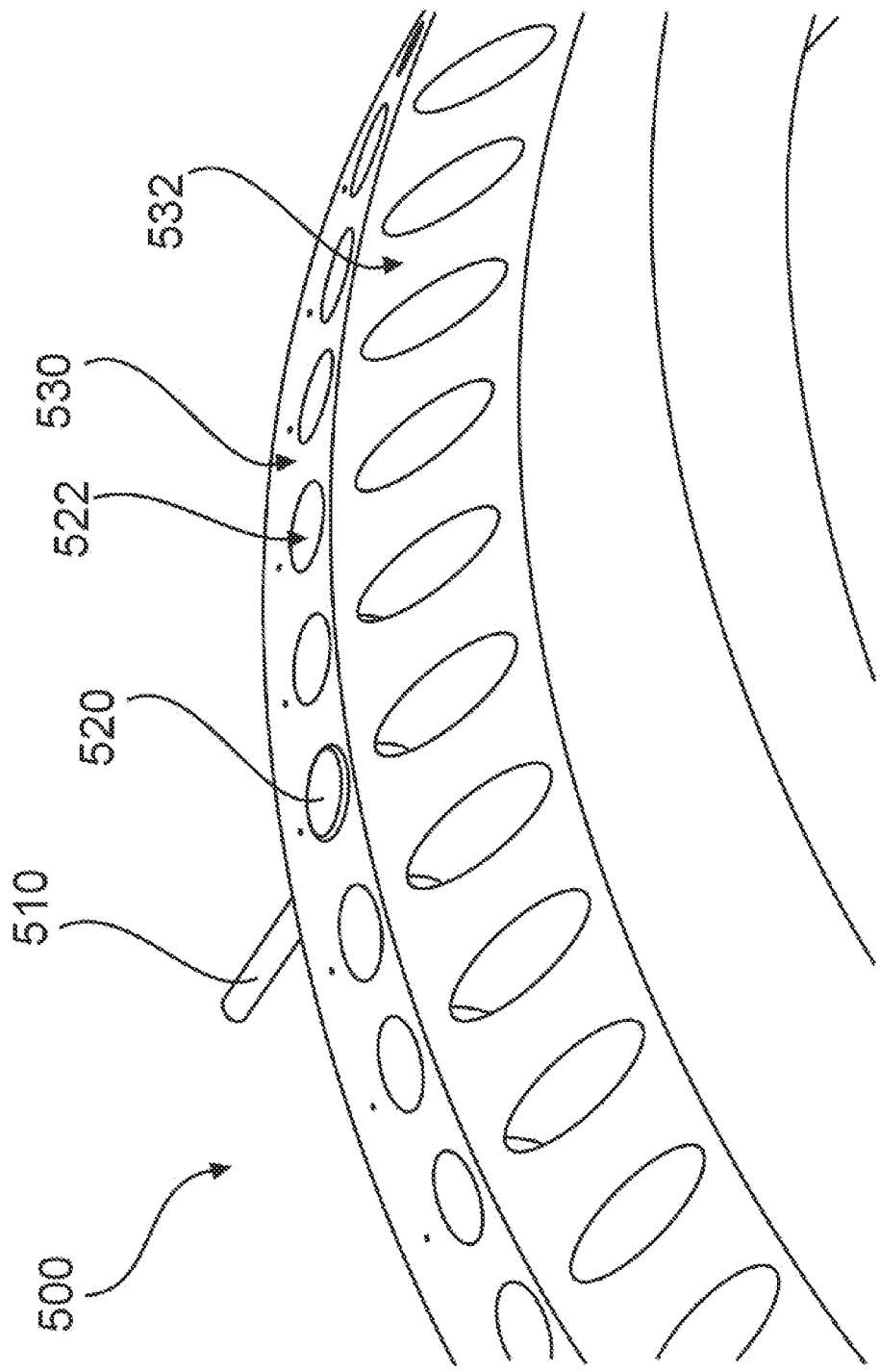
FIG. 8 shows a schematic three-dimensional view of an exemplary embodiment of a fastening region.

FIG. 8 shows a schematic three-dimensional view of an exemplary embodiment of a fastening region. The fastening region 500 is formed by a thickened portion 530, a tapering portion 532 and a wall. Transverse bolt openings 522 in which transverse bolts 520 can be arranged are arranged within the thickened portion 530 radially with respect to the passage direction of the fastening region 500. Furthermore, a longitudinal bolt 510 is arranged in the transverse bolt 520. It can be seen in particular in FIG. 9 that the longitudinal bolt cutouts 502, 504 adjoin the face side 501. Furthermore, it is shown that the longitudinal bolts 510, 512 extend through the longitudinal bolt cutouts 502, 504, project from the face side 501 and are arranged within a transverse bolt 520.

Figure 9:
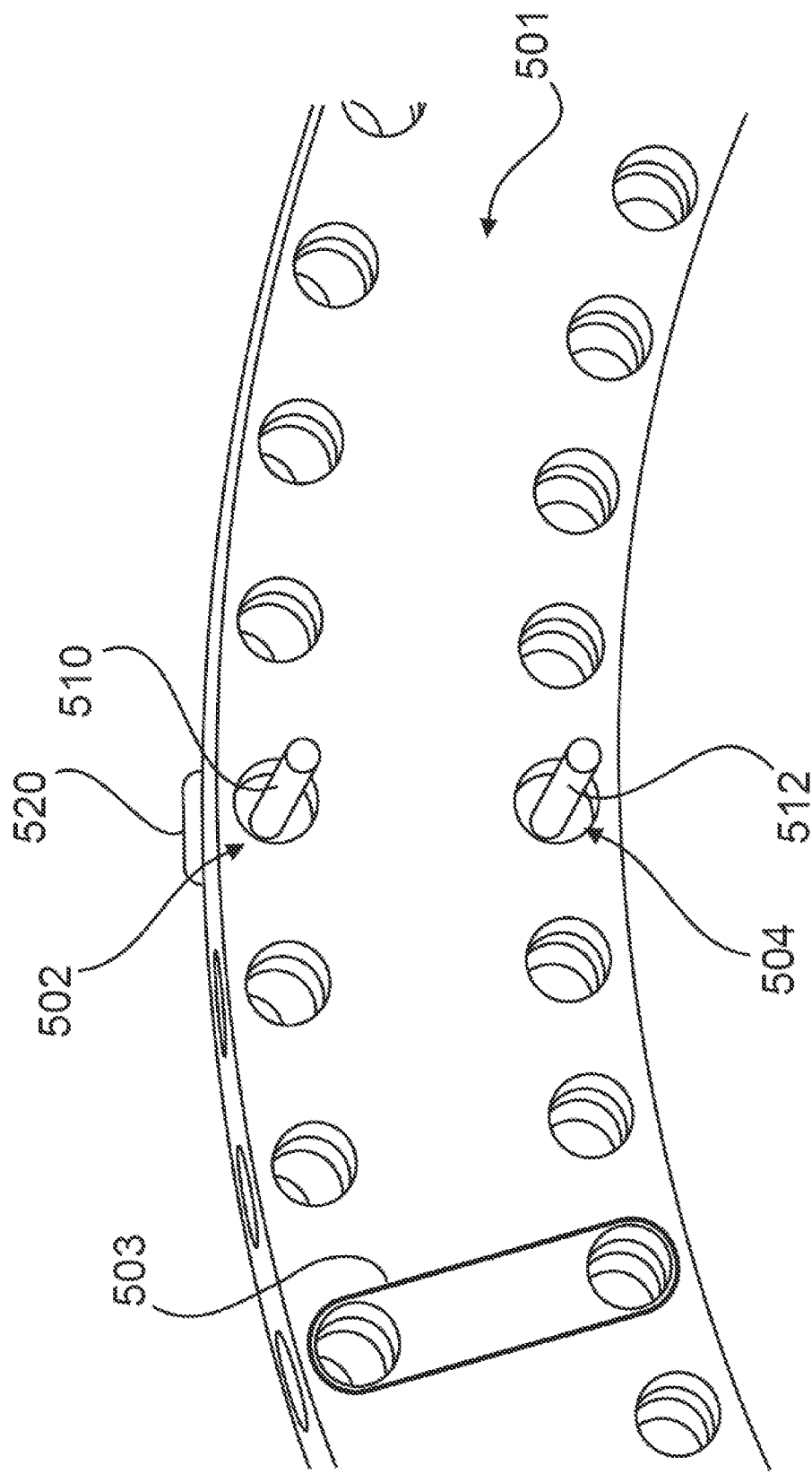
FIG. 9 shows a schematic three-dimensional view of the fastening region from FIG. 8.

FIG. 9 furthermore shows a configuration in which an elongate hole 503 is provided in the form of a longitudinal bolt cutout and is arranged to receive both longitudinal bolts 510, 512.

Figure 10:
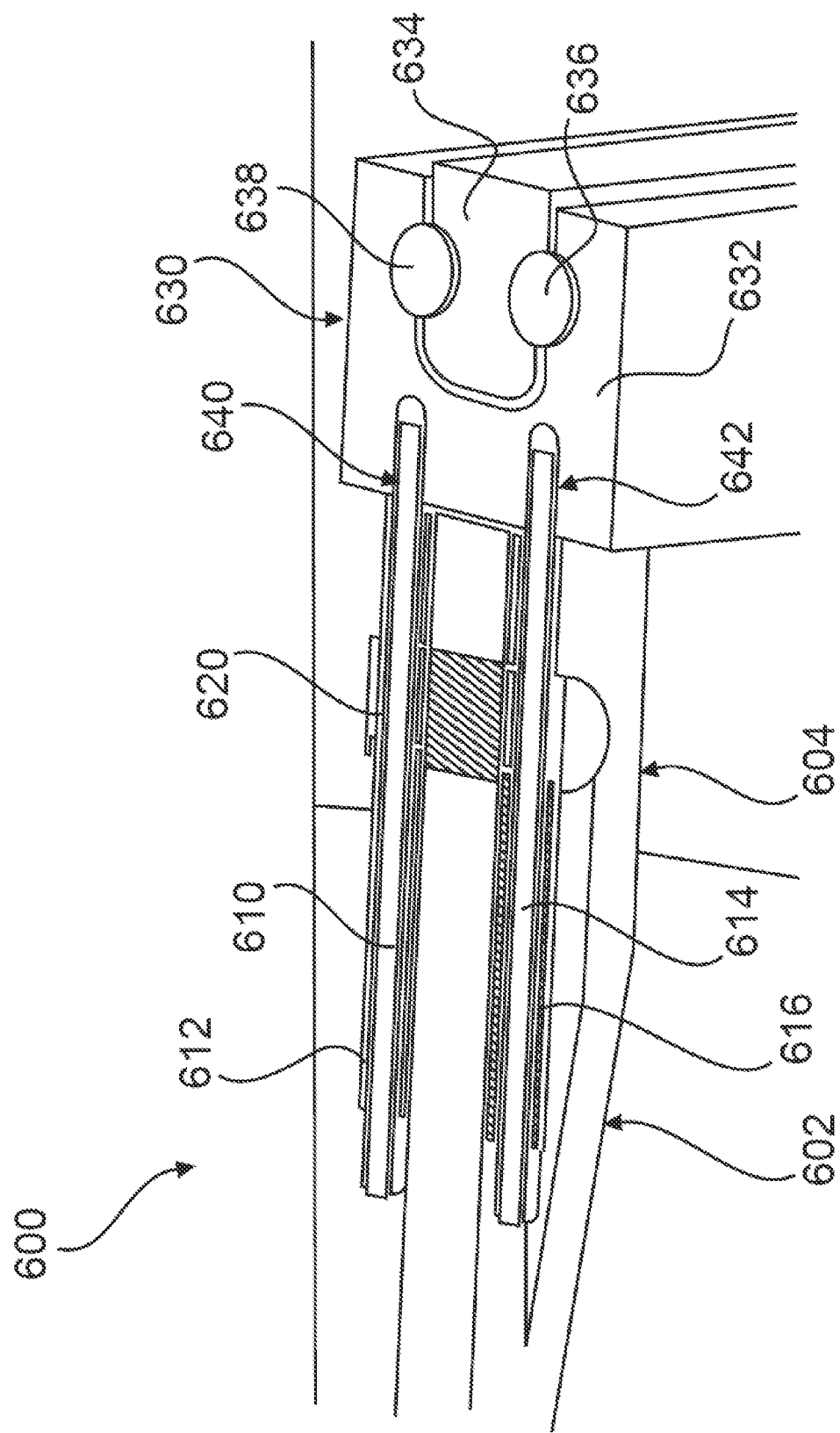
FIG. 10 shows a schematic three-dimensional view of a further exemplary embodiment of a rotor.

FIG. 10 shows a schematic three-dimensional view of an exemplary embodiment of a rotor. The fastening region 600 of a rotor blade comprises an inner tapering portion 602 and an inner thickened portion 604, through which an inner longitudinal bolt 614 extends. The longitudinal bolt 614 is secured on the side of the fastening region 600 by means of an inner expansion sleeve 616. The expansion sleeve 616 abuts on the face side against a transverse bolt 620. Analogously to the above-described embodiments, there is arranged radially opposite the inner tapering portion 602 and inner thickened portion 604 an outer tapering portion (not shown) and a thickened portion (not shown), through which there extends an outer longitudinal bolt 610 which is secured by means of an outer expansion sleeve 612 which abuts on the face side against the transverse bolt 620.

The fastening region 600 serves for the fastening of the rotor blade to the blade-fastening element 630, wherein the blade-fastening element 630 has a U-bearing 632 and a hub element 634, wherein the hub element 634 is mounted in the U-bearing 632 by means of rolling bodies 336, 338. The U-bearing 632 has an outer blind hole 640 and an inner blind hole 642, into which the longitudinal bolts 610, 614 are screwed. Due to the screwing of the longitudinal bolts 610, 612 into the blind holes 640, 642 and the fastening of the longitudinal bolts 610, 614 by means of the expansion sleeves 612, 616, it is possible for the rotor blade to be connected by way of the fastening region 600 to the blade-fastening element 630.

Figure 11:
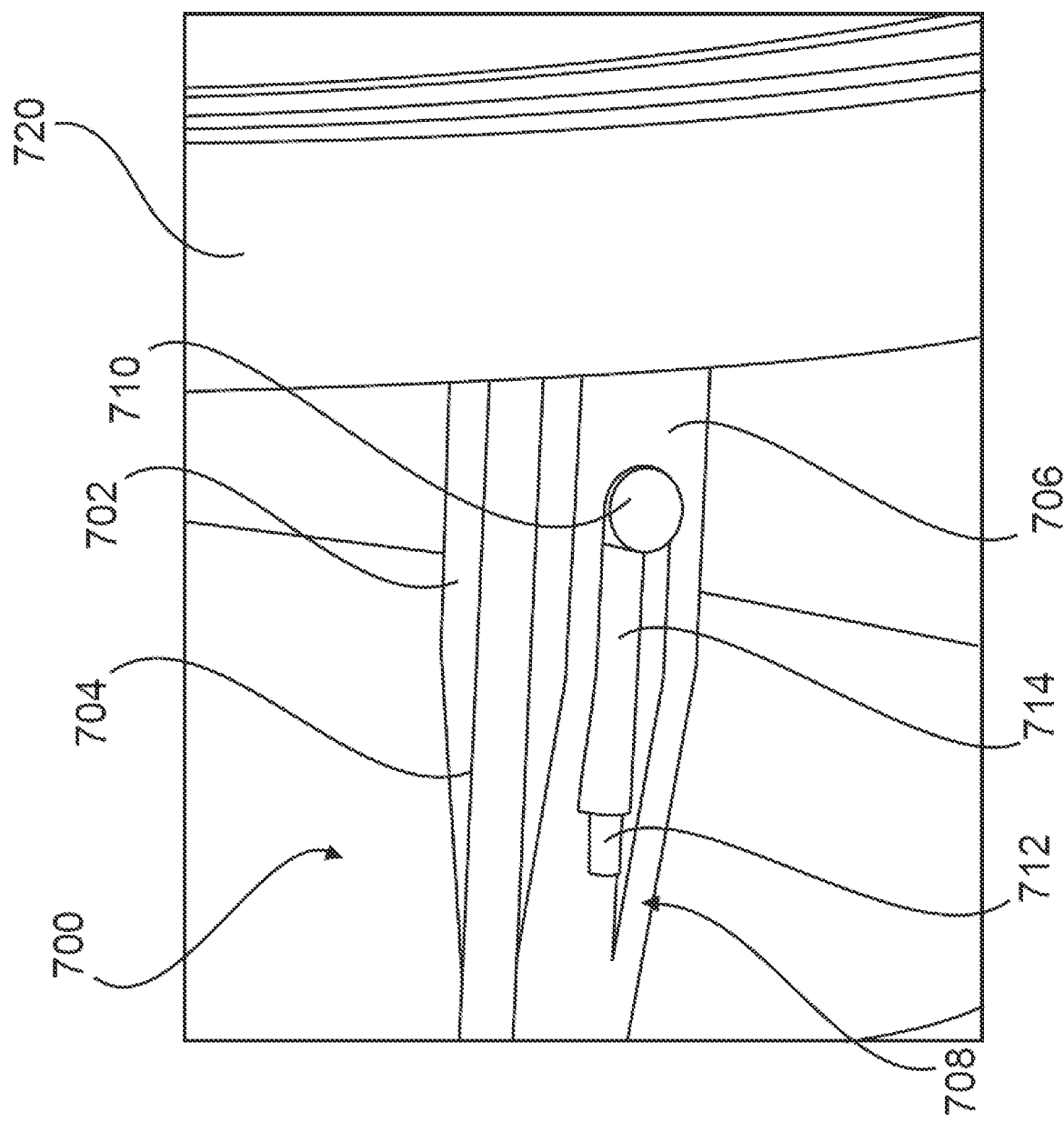
FIG. 11 shows a schematic three-dimensional view of a further exemplary embodiment of a rotor.

FIG. 11 shows a schematic three-dimensional view of a further exemplary embodiment of a rotor. The fastening region 700 has an inner thickened portion 702, an inner tapering portion 704, an outer thickened portion 706 and an outer tapering portion 708, wherein a transverse bolt 710 extends through the thickened portions 702 and 706. The rotor blade having the fastening region 700 is secured to a blade-fastening element 720 in such a way that longitudinal bolts, of which only the outer longitudinal bolt 712 is shown here, extend through a longitudinal bolt cutout of the thickened portions 702, 706 and are screwed in place in blind holes of the blade-fastening element 720. Furthermore, the longitudinal bolts are secured on the side of the fastening region by expansion sleeves 714. In the present case, it can be seen that a part of the longitudinal bolt cutout and a part of the fastening cutout are formed as a groove and not as a bore.

REFERENCE SIGNS 5, 108, 400, 400' Rotor blade
10, 200, 410, 500, 600, 700 Fastening region
12, 450, 522 Transverse bolt cutout
14, 212, 430, 520, 620, 710 Transverse bolt
16, 220, 420, 510, 610, 712 Outer longitudinal bolt
18, 30, 222, 223 First end of longitudinal bolt
20, 32, 224, 225 Second end of longitudinal bolt
22 Outer rotor blade-side longitudinal bolt cutout
24 Outer hub-side longitudinal bolt cutout
25, 40, 426, 446 Nut
26, 214 Outer transverse bolt opening
28, 221, 440, 512, 614 Inner longitudinal bolt
34 Inner rotor blade-side longitudinal bolt cutout
36 Inner hub-side longitudinal bolt cutout
38, 215 Inner transverse bolt opening
42, 320, 632 U-bearing
44, 46, 321, 322, 636, 638 Rolling body
48, 310, 634 Hub element
100 Wind turbine
102 Tower
104 Nacelle
106 Rotor
108a Rotor blade tip
108b, 501 Face side
109a, b Rotor blade segment
109c Rotor blade parting point
109d Fastening side
110 Spinner
202, 425, 530, 706 Outer thickened portion
203, 445, 604, 702 Inner thickened portion
204, 427, 532, 708 Outer tapering portion
205, 447, 602, 704 Inner tapering portion
206, 405 Rotor blade wall
210, 428, 428', 502 Outer longitudinal bolt cutout
211, 448, 448', 504 Inner longitudinal bolt cutout
240, 432 Outer fastening cutout
241, 462 Inner fastening cutout
242, 243, 612, 616, 714 Expansion sleeve
300, 630, 720 Blade-fastening element
330, 640 Outer blind hole
334, 344 Blind hole thread
340, 642 Inner blind hole
350 Bearing groove
503 Elongate hole
L Rotor blade longitudinal direction

The invention claimed is:

1. A rotor for a wind turbine, comprising:
a rotor blade having a rotor blade body with a rotor blade wall having a face side, the rotor blade body extending to a blade tip, and
a hub having a blade-fastening element having first and second blind holes for receiving a respective longitudinal bolt for fastening the rotor blade to the blade-fastening element,
wherein the rotor blade has a fastening region which is tubular shaped and arranged at the face side,
wherein the rotor blade wall has a thickened portion with an outer circumferential surface and an inner circumferential surface at the fastening region of the rotor blade,
wherein a first passage opening extends through the thickened portion of the outer circumferential surface and a second passage opening extends through the thickened portion of the inner circumferential surface, wherein the first and second passage openings have first and second opposite ends, wherein the first end of each of the first and second passage openings is arranged on the face side of the rotor blade, and
wherein first and second longitudinal bolts are arranged in the first and second blind holes, respectively, and in the first and second passage openings, respectively, for fastening the rotor blade to the blade-fastening element;
wherein the fastening region has a tapering portion at a face side-averted side of the thickened portion;
wherein the tapering portion has a fastening cutout extending from a first end of the tapering portion facing toward the hub to a second end of the tapering portion facing away from the hub, wherein the fastening cutout includes a cutout opening at the second end of the tapering portion.

2. The rotor as claimed in claim 1, wherein a surface normal of an opening cross section of a second end of the fastening cutout and a surface normal of an opening cross section of a first end of the fastening cutout are arranged at an angle relative to each other.

3. The rotor as claimed in claim 1, wherein a diameter of the fastening cutout is greater than a diameter of each of the first and second passage openings.

4. The rotor as claimed in claim 1, wherein a diameter of the fastening cutout is arranged and configured for receiving a counterpart element for connection to the first or second longitudinal bolts.

5. The rotor as claimed in claim 1, wherein the thickened portion and the tapering portion are annular shaped.

6. The rotor as claimed in claim 1, wherein, on a bearing side, which is averted from the rotor-blade side, the blade-fastening element has a bearing groove with a groove width, a groove base surface, an outer groove side surface, an inner groove side surface, and a groove opening.

7. The rotor as claimed in claim 6, wherein:
the groove base is spaced apart from a blind hole base in an axial direction, and/or
a radial spacing between the outer groove side surface and a blind hole axis is at least two times smaller than the blind hole diameter, and/or
a radial spacing between the inner groove side surface and a blind hole axis is at least two times smaller than the blind hole diameter, and/or
a blind hole longitudinal axis intersects the groove base.

8. The rotor as claimed in claim 1, wherein:
the rotor blade has in the fastening region a transverse bolt cutout which extends substantially radially with respect to a passage direction of the fastening region,
a transverse bolt with a transverse bolt opening is arranged in the transverse bolt cutout, and
the transverse bolt opening forms a part of the passage opening, and the longitudinal bolt extends through the transverse bolt opening.

9. The rotor as claimed in claim 1, wherein the blade-fastening element is a hub adapter or a blade flange bearing.

10. A wind turbine comprising the rotor as claimed in claim 1.

11. The rotor as claimed in claim 2, wherein the surface normal of the opening cross section of the second end of the fastening cutout and a longitudinal axis of the fastening cutout are arranged at an angle relative to each other.

12. The rotor as claimed in claim 1, wherein one of the first and second passage openings is accessible from the second end of the tapering portion through the cutout opening and the fastening cutout.

13. A rotor blade for a wind turbine, comprising:
a body that extends from a blade tip to a face side, the body having a wall, and
a fastening region that is tubular shaped and arranged adjoining the face side, wherein the fastening region is configured to fasten the rotor blade to a blade-fastening element of a rotor hub,
wherein the fastening region has thickened portions arranged at an outer circumferential side and an inner circumferential side of the body, and
wherein the thickened portions of the outer circumferential side and the inner circumferential side include respective passage openings with first and second ends, wherein the first end of each passage opening is arranged on the face side;
wherein the fastening region has a tapering portion at a face side-averted side of the thickened portions,
wherein the tapering portion has a fastening cutout extending from a first end of the tapering portion facing toward the rotor hub to a second end of the tapering portion facing away from the rotor hub, wherein the fastening cutout includes a cutout opening at the second end of the tapering portion.

14. A method for mounting the rotor blade as claimed in claim 13 to the blade-fastening element of the rotor hub, the method comprising:
fastening first and second longitudinal bolts in blind holes of the blade-fastening element of the rotor hub,
leading portions of the longitudinal bolts that project from the blind holes through the passage openings, wherein the face side of the rotor blade at least sectionally abuts against a rotor-blade side of the blade-fastening element, and
fastening in a region of the fastening cutout by attaching counterparts at ends of the longitudinal bolts projecting from the passage openings.

15. A rotor blade segment for a rotor blade for a wind turbine, comprising:
a rotor blade segment having a wall and extending from a blade end to a fastening side, and
a fastening region of a tubular shape and arranged adjoining the fastening side, wherein the fastening region is configured to fasten the rotor blade segment to another rotor blade segment for forming a rotor blade,
wherein the fastening region includes thickened portions arranged at an outer circumferential surface and an inner circumferential surface of the wall of the rotor blade segment,
wherein the thickened portions, on each side of the rotor blade wall, have a plurality of passage openings with opposing ends, wherein a first end of the opposing ends is arranged at the fastening side;
wherein the fastening region has a tapering portion at a face side-averted side of the thickened portions,
wherein the tapering portion has a fastening cutout extending from a first end of the tapering portion facing away from the blade end to a second end of the tapering portion facing toward the blade end, wherein the fastening cutout includes a cutout opening at the second end of the tapering portion.

* * * * *